United States Patent [19]

Harnsberger

[11] 3,861,467

[45] Jan. 21, 1975

[54] PERMEABLE CEMENTING METHOD

[75] Inventor: Bobby G. Harnsberger, Houston, Tex.

[73] Assignee: Texaco Inc., New York, N.Y.

[22] Filed: Dec. 28, 1973

[21] Appl. No.: 429,426

[52] U.S. Cl.................................. 166/276, 166/293
[51] Int. Cl..... E21b 33/13, E21b 43/02, C04b 7/02
[58] Field of Search ........... 166/276, 278, 293, 294, 166/292, 282, 285, 295; 106/90, 92, 98

[56] References Cited
UNITED STATES PATENTS

| | | | |
|---|---|---|---|
| 2,776,713 | 1/1957 | Morgan et al. | 166/293 |
| 2,801,931 | 8/1957 | Morgan et al. | 166/293 X |
| 2,878,875 | 3/1959 | Dunlap et al. | 166/293 |
| 2,933,135 | 4/1960 | Johnson | 166/293 X |
| 3,145,774 | 8/1964 | Patchen | 166/293 |
| 3,236,305 | 2/1966 | Parks | 166/282 |
| 3,389,751 | 6/1968 | Harnsberger | 166/276 |
| 3,414,420 | 12/1968 | Maravilla et al. | 106/92 |
| R27,227 | 11/1971 | Harnsberger | 166/293 X |

*Primary Examiner*—Stephen J. Novosad
*Attorney, Agent, or Firm*—Thomas H. Whaley; C. G. Ries

[57] ABSTRACT

The invention relates to an improved method of and composition for the treatment of an incompetent formation penetrated by a wellbore to prevent the movement of sand particles from the formation to the wellbore during recovery of the formation fluids by forming a treating composition of sand, cement, water and xanthan gum in a hydrocarbon carrier oil, injecting the treating composition into the formation under pressure, permitting the cement to set and form a permeable barrier film between the formation and wellbore and recovering fluids from the formation through the formed permeable cement barrier.

6 Claims, No Drawings

PERMEABLE CEMENTING METHOD

The present invention relates to the treatment of permeable underground formations. More particularly, the present invention relates to an improved method of treating permeable underground oil and/or gas containing formations to stabilize the sandy portion thereof and to an improved treating composition useful in the stabilization of incompetent sand containing underground formations.

The recovery of fluids, such as gas and/or oil from underground formations, has been found to be troublesome in areas wherein the underground formation is composed on one or more incompetent sand containing layers or zones. The sand particles in the incompetent zone and/or layer tend to move or migrate to the wellbore during recovery of the formation fluids from the particular zone and/or layer and frequently the moving sand particles block the passageways leading to the wellbore. Plugging or materially impairing the flow of the formation fluid toward the borehole results in a loss of these fluids to the producer or so decreases the rate of oil recovery from the well as to cause the well to be shut down because it is economically unattractive to continue to produce therefrom. An additional adverse factor resulting from the movement of the sand particles toward the wellbore is that they are often carried along with the formation fluids to the wellbore and passed through the pipes, pumps, etc., being used to recover the formation fluids to the surface with resulting damage to the moving parts thereof as the sand particles are very abrasive.

Many attempts have been made heretofore to prevent or decrease the flow of undesirable sand particles in the formation and/or in the production tubing and associated equipment, such as by the placement of sand screens, filters, liners, and so forth. These prior attempts have been unsuccessful for a number of reasons, among which is that these mechanical devices fail to prevent completely the flow of the formation particles into the production equipment. In addition, these devices interfere with various types of completion and workover operations. In recent years the industry has attempted to avoid the difficulties encountered in the use of mechanical devices by employing various chemical compositions to effect consolidation of the underground incompetent formations. These methods have generally consisted of injecting into the underground formation polymerizable resinous materials which, when subsequently polymerized, consolidate the formation sand to form permeable barriers in the formation to prevent the sand particles from movement therethrough. However, this technique of sand consolidation has not met with widespread acceptance because of the inherent difficulties of effecting polymerization and even distribution of the resinous materials in the formation to a degree sufficient to consolidate these underground formations and yet permitting the unobstructed flow of the desirable formation fluids therethrough. Further, the cost associated with these resin coating methods has been relatively high in comparison with prior mechanical methods.

It is known from commonly assigned U.S. Pat. No. 3,428,121, issued Feb. 18, 1969, Reissue Pat. No. 27,227 dated Nov. 9, 1971 to form a treating composition of sand, cement and water in a hydrocarbon carrier oil and to inject the formed composition into the formation under pressure, and permitting the cement to set and form a permeable barrier between the formation and wellbore, and then recovering fluids from the formation thru the formed permeable cement barrier.

It has now been found that the method and composition disclosed in the aforesaid patents can be further improved by the practice of the present invention.

By the method of the present invention one is able to treat more effectively the underground formation to be stabilized in a rapid and efficient manner.

One object of the present invention is to provide an improved method of treating underground sand containing formations to stabilize the incompetent formation. An additional object is to provide an improved fluid permeable barrier between the formation sand and the wellbore to prevent or to minimize the flow of unconsolidated sand particles therethrough while maximizing the flow of desired fluids and particularly petroleum hydrocarbons therethrough. A still further object is to provide an improved novel treating composition for use in stabilizing incompetent sand formations and to a method of placing same to form a permeable cement filter against the incompetent formation.

How these and other objects of the invention are accomplished will become apparent with reference to the accompanying disclosure. In at least one embodiment of the method of this invention at least one of the foregoing objects will be obtained.

In the practice of the methods and compositions for stabilizing incompetent oil-containing formations as described in the aforesaid patents, several difficulties arose with the treating composition and its application to an oil producing formation. Specifically, the particles of cement in the treating composition mixture were sometimes separated from the sand particles thereof when suspended in the carrier fluid, especially when the oil carrier fluid contained a relatively high naphthenic acid content. Addition of salt to the water component did not completely overcome the adverse effects of the naphthenic acids. The presence of these naphthenic acids in the carrier fluid impaired the cohesiveness of the cement-coated sand grains in the mixture as the admixture was pumped into the wellbore, with the result that an adequate compressive strength of the cement barrier was not often obtained or retained for lengthy periods of time. Consequently, the cement barrier failed to block the flow of sand particles into the formation.

It has now been discovered that an improved method of treating an incompetent sand containing underground formation comprises introducing against said formation a particular treating composition consisting essentially of sand, cement, salt water and a xanthan gum dispersed or suspended in a hydrocarbon oil in an amount sufficient to stabilize the formation and to form a fluid permeable barrier between the formation and the wellbore. The resultant formed permeable barrier serves to prevent or to materially reduce the flow of the unconsolidated sandy particles therethrough while permitting the flow of desirable formation fluids through the permeable barrier at a substantially unimpaired rate.

More specifically, the present invention comprises a method of and composition for the treatment of an incompetent formation penetrated by a wellbore to prevent the movement of sand particles from the formation to the wellbore during recovery of the formation fluids by forming a treating composition of sand, cement, salt water and a xanthan gum in the hydrocarbon carrier oil, injecting the treating composition into the formation under pressure, permitting the cement to set and form a permeable barrier between the formation and well bore and recovering fluids from the formation through the formed permeable cement barrier.

In carrying out the method of the present invention the sand-cement-salt water-xanthan gum treating composition suspended in the petroleum hydrocarbon fraction is pumped down the wellbore under sufficient pressure to force the treating composition of the sand, cement and salt water against the unconsolidated formation adjacent to or in reasonable proximity to the wellbore.

When the improved treating composition is in contact with the formation to be stabilized adjacent to the wellbore, the treating composition is permitted to remain in contact with the unconsolidated formation and the cement component of the treating composition is permitted to set up and harden. Hardening of the cement can be accelerated or retarded through the use of additives which are known in the art. The borehole is closed in for an appropriate period of time to permit hardening, e.g., from 8 to 72 hours. Thereafter the well can be equipped for production and the formation fluids can be recovered by passing through the resulting formed permeable cement barrier into the wellbore and recovered therefrom without the formation fluids being contaminated with the presence therein of unconsolidated sand particles.

The improved method of the present invention is adaptable for use in any type of well completion but it is generally used in a well wherein casing has been set and which is equipped with perforations in the casing at the desired intervals where the unconsolidated formation sands are located. Packers can be initially set above and below the perforated intervals to prevent the treating composition from passing into the non-isolated portions of the well and also to permit build-up of sufficient pressures on the treating composition to force same through the perforations and against the formation without plugging up the wellbore. After the treating composition has been forced through the casing perforations and against the formation, the well is shut in to permit the cement to set and form a permeable cement barrier for the unconsolidated sand in the formation.

The treating composition useful in the method of the present invention must meet certain specific requirements. The sand component in general should be closely sized in the broad range 10-80 mesh, i.e., 12-20, 20-40, 40-60 mesh or intermediate meshes, to permit effective relatively high permeability cement barriers being formed. In addition, the ratio of the sand component to the cement component prior to the sand-cement-salt water-xanthan gum treating composition being suspended in the hydrocarbon carrier oil should be from about 3 parts to about 12 parts by weight of sand per part of cement. It has been found that a frac sand, i.e., a sand customarily used in formation fracturing operations, having a size of between about 20 to 40 mesh is suitable for use in the treating composition of the present invention. It is preferred to use a graded sand with the larger grains being not more than about twice the diameter of the smaller grains, i.e., 12-20 mesh, 20-40 mesh, 40-60 mesh, etc.

In general, from about 5 to 6 parts of a 20-40 mesh sand is employed per part of cement as the sand component because of its ready availability and its adaptibility for use in stabilizing most formations. In addition, the use of a 20-40 mesh sand appears to prevent premature bridging which is likely to be more prevalent with finer mesh sands.

Sand particles which are coarser than about 10 mesh and finer than about 80 mesh are unsuitable for use in the composition of the present invention. The coarser particles are not satisfactory because the resultant set cement has too great a permeability to prevent the flow of very find unconsolidated sand particles therethrough when the well is placed on production. Very fine sand particles in the treating composition of the present invention, that is those sand particles finer than about 80 mesh, are unsuitable because the resultant set cement has too low a permeability to permit the flow of desired formation fluids therethrough.

The cement component of the composition of the present invention should be present in the dry mixture in a ratio of about 1 part of cement to from 3 to about 12 parts by weight of sand on a weight basis. The cement component of the composition of the present invention may be any of the cements normally used in oil well cementing operations as well as Plaster of Paris cement, sodium silicate cement, a silico phosphate cement, an acid phosphate cement or a possolan cement, a Sorel cement or a litharge cement. It is preferred that the cement component be a light weight portland cement having a density of about 75 lbs. per cubic foot and a chemical analysis approximately as follows: silicon dioxide 38.3 percent, aluminum oxide 13.0 percent, ferric oxide 5.2 percent, calcium oxide 35.7 percent, magnesium oxide 1.6 percent and sulfur trioxide 2.4 percent with a loss on ignition of approximately 3.3 percent. This particular light weight portland cement has been found to be most suitable in the composition of the present invention since permeable cements made from this cement are most stable to attack by formation brines containing sodium chloride or sodium sulfate. Other oil well cements are not as resistant to attack by formation brines or sulfate solutions and therefore are not as practical for use in the cement composition of the present invention. These other cements appear to lose some of their compressive strength and become eroded from contact with sodium chloride and sodium sulfate solutions. In contrast, the cements of the composition of the present invention are very resistant to erosion by sodium chloride or sodium sulfate solutions and do not lose their compressive strength even after prolonged exposure thereto.

The salt water component of the treating composition will vary with the type of cement and the sand mesh range. Satisfactory results are obtained with from about 0.7 to about 0.95 part of water per part by weight of cement, when 20-40 mesh sand is used. Excess water may result in the separation of cement laden droplets of water from the sand whereas insufficient water may result in the separation of cement solids from the sand. In either case the formation may be damaged.

It has been found that the use of water containing salts such as sodium and/or calcium chloride are not completely effective in preventing dispersions of the cement with oils containing objectionable surface active agents such as naphthenic acids as the carrier medium. This known method described that the salt concentration should approach that of a saturated solution at ambient temperature as the oil neutralization number approaches 1.0.

The xanthan gum found suitable for use in the present invention is sold under the "Kelzan" trade name. This gum, a higher molecular weight polysaccharide, is more fully described in U.S. Pat. No. 3,236,305 and Journal of Applied Polymer Science, Volume 5, Issue No. 7, pages 519–526 (1961), entitled "Polysaccharide B-1459; A New Hydrocolloid Polyectrolyte Produced from Glucose by Bacterial Fermentation," by Jeannes, Pittsley and Seni, the disclosures thereof being incorporated herein by reference. The xanthan gum component is used in an amount of from about 0.1 to about 1 percent by weight thereof, based on the weight of the water component.

The carrier medium for the sand-cement-salt water-xanthan gum treating composition is a hydrocarbon oil. Suitable hydrocarbon oils include diesel oil fractions of a petroleum crude oil containing surface active agents such as naphthenic acids therein in amounts of from about 100 to 800 ppm. Calculated neutralization numbers for such fractions are from 0.35 to about 3.14, based on an assumed molecular weight of 250 for the naphthenic acids, as well as crude oil. Diesel oil fractions having the following properties are normally employed since such fractions are relatively inexpensive and usually readily available at or near the treatment site. Typical properties are an API Gravity of 30° to about 42°, a Viscosity at 100° F. of 32–45 SUS, a cetane number from about 40 to about 50, and a 10 percent Boiling Point Temperature of about 440° and an End Point Temperature of about 655° F. Sufficient of the hydrocarbon oil carrier medium is employed to suspend the treating composition therein. It has been found that most satisfactory compositions have a treating composition density in the range of from 8 to 12 pounds per gallon and the amounts of solids suspended in the hydrocarbon oil can be in the range of from about 0.5 to 5 lbs. of the treating composition (sand, cement, salt water and xanthan gum) per gallon of the hydrocarbon oil carrier medium.

The sand-cement-salt water-xanthan gum treating composition can be prepared in the customary manner such as by mixing the components at the surface in a suitable vessel or in a mixing truck. The order of addition of the components of the treating composition is not critical. However, it is preferred to slowly add the xanthan gum to the water with vigorous agitation and to continue stirring the mixture until a fairly uniform gel solution is obtained. Then the sand-cement mixture is added to the gel solution.

The hydrocarbon carrier medium containing the suspended solids is pumped down the wellbore and into the formation at rates which may vary with well conditions. Generally, a rate of from about 1 to 4 barrels of the suspended solids in the carrier medium per minute is suitable for perforated intervals of 4–10 feet with higher rates being used for longer intervals. Such rates have been found to give the satisfactory results, and the resulting permeable cement barrier formed in the unconsolidated formation has a sufficiently high compressive strength and sufficient permeability to permit the flow of formation fluids therethrough while stabilizing or restraining the formation sands.

Following is a description by way of example of the method and composition for the practice of the present invention.

A series of treating compositions were prepared containing the various components and amounts shown in the following table. The carrier fluids used are also set forth in this table.

The test procedure was conducted in the following manner:

Each testing composition was prepared using 2,000 grams of 20–40 mesh frac sand, 366 grams of Trinity Light Weight Cement and 266 grams of water, fresh or salt, as indicated. The indicated amount of the xanthan gum, "Kelzan MF" grade, was then added with mixing. A constant weight of the above composition and a constant volume of the carrier oil, a diesel oil fraction having a 10 percent boiling point of 480° F. and a 625° F. End Point, a cetane No. of 35–40, a naphthenic acid content of 600–800 ppm were placed in a Waring blender and the blender was operated at its highest speed for 30 seconds. The oil was decanted and filtered. The cement recovered on the filter paper was dried and weighed. The weight of dispersed cement was expressed as a percentage of the cement component present in the treating composition.

TABLE

| EXAMPLE | TYPE WATER | AMOUNT OF XANTHAN GUM (GRAMS) | % CEMENT DISPERSED | % REDUCTION OF DISPERSION | % IMPROVEMENT IN REDUCTION OF DISPERSION OVER RESULTS OBTAINED IN EXAMPLE "B" |
|---|---|---|---|---|---|
| Blank "A" | Fresh | — | 100 (approx.) | — | |
| 1 | do. | 2.66 | 8.03 | 92 | |
| Blank "B" | Salt[1] | — | 6.54 | 93.5 | — |
| 2 | do. | 0.266 | 4.46 | 95.5 | 31.8 |
| 3 | do. | 1.06 | 2.82 | 97.2 | 56.9 |
| 4 | do. | 1.86 | 4.43 | 95.6 | 32.3 |
| 5 | do. | 2.66 | 3.75 | 96.3 | 42.7 |

[1]The salt water was a synthetic brine prepared by adding 10% by weight of sodium chloride to fresh water.

Inspection of the data for Examples 1 to 5 shows that the presence of xanthan gum in the treating composition resulted in a substantial reduction in the amount of cement dispersed in the high naphthenic acid content diesel oil used as the carrier medium when compared with the results shown for Blank Examples A and B.

It has been found that the above test procedure correlates with field experience.

After a twenty week stability test, a permeable cement pack made in accordance with the present invention showed no significant changes in permeability or compressive strength.

I claim:

1. A method of treating an incompetent formation penetrated by a wellbore to prevent the movement of unconsolidated sand particles from said incompetent formation to the wellbore as formation fluids are recovered from said formation which comprises forming a treating composition consisting essentially of 1 part of cement, from 3 to 12 parts by weight of sand having a particle size between 10 and 80 mesh, from about 0.7 to about 0.95 part by weight of salt water to wet the sand and cement particles each per part of cement, and from about 0.1 to about 1 percent by weight of xanthan gum, based on the amount of water, suspending the resultant treating composition in a carrier oil fraction consisting of a refined diesel oil containing from 100 to about 800 ppm of naphthenic acids therein, placing said suspension against the unconsolidated formation, permitting the cement to set to form a permeable cement barrier between the formation and the wellbore whereby formation fluids can be recovered by passage through the formed permeable cement barrier.

2. A method as claimed in claim 1 wherein the hydrocarbon oil suspension of the treating composition is placed against said formation by injecting said suspension at a pressure sufficient to force the hydrocarbon oil suspension against the unconsolidated formation.

3. A method as claimed in claim 1 wherein the treating composition consists essentially of cement, from 5 to 6 parts by weight of sand particles having a mesh size of from about 20 mesh to about 40 mesh, from 0.7 to 0.95 part by weight of salt water, both per part by weight of cement, and from 0.1 to 1.0 percent by weight of xanthan gum, based on the amount of water.

4. A method as claimed in claim 1 wherein the treating composition is suspended in the hydrocarbon carrier oil in an amount of from about 0.5 to 5 pounds of the treating composition per gallon of the hydrocarbon carrier oil.

5. A method as claimed in claim 1 wherein the carrier oil fraction is a diesel oil fraction containing from about 100 to 500 ppm of naphthenic acid therein.

6. A method as claimed in claim 1 wherein prior to injecting the suspended treating composition against the unconsolidated formation, the unconsolidated formation is washed with salt water to remove at least a portion of the unconsolidated sand particles adjacent to the wellbore.

* * * * *